United States Patent
Baehrle-Miller et al.

(10) Patent No.: US 10,239,503 B2
(45) Date of Patent: Mar. 26, 2019

(54) METHOD FOR PROVIDING THE APPLICATION FORCE GENERATED BY A PARKING BRAKE

(71) Applicant: ROBERT BOSCH GMBH, Stuttgart (DE)

(72) Inventors: Frank Baehrle-Miller, Schoenaich (DE); Dieter Blattert, Kirchheim/Neckar (DE); Tobias Putzer, Bad Friedrichshall (DE)

(73) Assignee: ROBERT BOSCH GMBH, Stuttgart (DE)

( * ) Notice: Subject to any disclaimer, the term of this patent is extended or adjusted under 35 U.S.C. 154(b) by 578 days.

(21) Appl. No.: 14/381,183

(22) PCT Filed: Jan. 18, 2013

(86) PCT No.: PCT/EP2013/050897
§ 371 (c)(1),
(2) Date: Aug. 26, 2014

(87) PCT Pub. No.: WO2013/127560
PCT Pub. Date: Sep. 6, 2013

(65) Prior Publication Data
US 2015/0041257 A1 Feb. 12, 2015

(30) Foreign Application Priority Data
Feb. 27, 2012 (DE) .................. 10 2012 202 959

(51) Int. Cl.
*B60T 13/00* (2006.01)
*B60T 8/17* (2006.01)
(Continued)

(52) U.S. Cl.
CPC .................. *B60T 8/17* (2013.01); *B60T 7/12* (2013.01); *B60T 8/171* (2013.01); *B60T 13/74* (2013.01); *B60T 13/741* (2013.01); *B60T 17/221* (2013.01)

(58) Field of Classification Search
CPC ......... B60T 7/045; B60T 8/17; F16D 2121/24
See application file for complete search history.

(56) References Cited

U.S. PATENT DOCUMENTS

2004/0212251 A1 10/2004 Kinder et al.
2004/0238299 A1 12/2004 Ralea et al.
(Continued)

FOREIGN PATENT DOCUMENTS

DE 197 32 168 1/1999
DE 100 21 601 11/2001
(Continued)

OTHER PUBLICATIONS

International Search Report for PCT/EP2013/050897, dated Jan. 18, 2013.

*Primary Examiner* — Nicholas J Lane
(74) *Attorney, Agent, or Firm* — Norton Rose Fulbright US LLP; Gerard Messina

(57) ABSTRACT

In a method for providing the application force generated by a parking brake, which is at least partially generated by an electromechanical brake device having an electric brake motor, a retensioning process is terminated in the event that (i) the motor current exceeds a limit value or (ii) the rotational speed of the motor drops below a limit value.

15 Claims, 3 Drawing Sheets

(51) Int. Cl.
  *B60T 8/171* (2006.01)
  *B60T 13/74* (2006.01)
  *B60T 17/22* (2006.01)
  *B60T 7/12* (2006.01)

(56) References Cited

U.S. PATENT DOCUMENTS

| | | | |
|---|---|---|---|
| 2009/0305848 A1* | 12/2009 | Straub | B60T 7/107 |
| | | | 477/184 |
| 2011/0042171 A1* | 2/2011 | Knechtges | B60T 8/32 |
| | | | 188/106 F |
| 2011/0153147 A1* | 6/2011 | Watanabe | B60T 7/12 |
| | | | 701/31.4 |
| 2011/0224880 A1* | 9/2011 | Baehrle-Miller | B60T 7/042 |
| | | | 701/70 |
| 2012/0085599 A1* | 4/2012 | Ito | B60T 13/741 |
| | | | 188/72.6 |
| 2014/0149012 A1* | 5/2014 | Shiraki | B60T 7/12 |
| | | | 701/70 |

FOREIGN PATENT DOCUMENTS

| | | |
|---|---|---|
| DE | 103 61 042 | 5/2005 |
| DE | 10 2004 059688 | 6/2006 |
| DE | 10 2009 047127 | 5/2011 |
| JP | 2002225701 A | 8/2002 |
| JP | 2006199280 A | 8/2006 |
| JP | 2007008198 A | 1/2007 |
| JP | 2009126180 A | 6/2009 |
| JP | 2010058536 A | 3/2010 |
| JP | 2010076479 A | 4/2010 |
| WO | WO 99/26829 | 6/1999 |
| WO | WO 2009/033990 | 3/2009 |

* cited by examiner

METHOD FOR PROVIDING THE APPLICATION FORCE GENERATED BY A PARKING BRAKE

BACKGROUND OF THE INVENTION

1. Field of the Invention

The present invention relates to a method for providing the application force generated by a parking brake in a vehicle.

2. Description of the Related Art

Parking brakes for generating an application force that brings the vehicle to a halt are already known in general; these parking brakes have an electric brake motor, which when actuated, presses a brake piston supporting a brake pad against a brake disk. A parking brake of this type is described in published German patent document DE 103 61 042 B3, for example.

Under certain conditions it may be useful to perform retensioning after a period of time following the first tensioning of the parking brake, so that a loss in application force caused by cooling of the brake disk is able to be compensated. However, it must be taken into account here that the hydraulic vehicle brake is acting on the brake piston as well, so that if hydraulic pressure is active in the brake system, the electromechanically set application force and a hydraulic application force are superposed.

BRIEF SUMMARY OF THE INVENTION

The present invention is based on the objective of ensuring proper functioning and excellent operational reliability of a parking brake for a vehicle by simple measures, the parking brake having an electric brake motor for generating an electromechanical application force.

The method of the present invention may be used for parking brakes in vehicles provided with an electromechanical brake device that includes an electric brake motor, via which an application force is able to be generated to hold the vehicle during standstill. When the electric brake motor performs a rotary motion, a control element executes a control motion, which causes a brake piston carrying a brake pad to be pressed against a brake disk in the axial direction.

A supplementary brake device may possibly act on the brake disk, for instance the hydraulic pressure of a hydraulic brake device, such as the regular vehicle brake, for example, with whose aid braking processes are executed while the vehicle is being driven. The brake piston supporting the brake pad is pressed against the brake disk via the hydraulic pressure of the brake device. The hydraulic pressure of the brake device may also be active when the vehicle is standing still and lead to an additional application force, which is added to the electromechanical application force of the brake motor. The hydraulic pressure, for example, is generated in that the driver acts on the brake pedal when operating the parking brake or in that hydraulic pressure is generated via a driver assistance system, e.g., an electronic stability program (ESP), which also becomes effective at the time when the electrical brake motor of the parking brake is actuated.

If retensioning is to be carried out by a renewed actuation of the electric brake motor and if high hydraulic brake pressure is already applied, then the setpoint application force is unable to be reached by the electric brake motor, since this application force cannot act randomly against a pretensioned system. Because of the superpositioning of the hydraulic application force and the electromechanical application force, the supplied final force is greater than in the actuation of the electric brake motor alone. If the brake motor is actuated nonetheless during the retensioning process, although the application force cannot be increased further, this results in high component stresses, especially in the brake motor and the control electronics in the control unit that is assigned to the brake motor. In addition, more electrical energy than required is withdrawn from the vehicle electrical system.

In order to avoid these disadvantages, a retensioning process, in which another actuation of the electric brake motor of the parking brake takes place after a first tensioning process, will be terminated if the motor current, or a variable correlating with the motor current, exceeds an assigned limit value. A steep increase in the motor current during the retensioning process indicates that the brake piston is traveling no farther and the electric brake motor is blocking. To avoid mechanical and thermal damage and a high energy withdrawal from the vehicle electrical system, the electric brake motor is therefore switched off once the motor current exceeds an assigned limit value during the retensioning. Instead of the motor current, variables correlating with the motor current may be considered as well.

In addition or as an alternative, the rotational speed of the motor or a variable correlating with the motor speed may also be considered as criterion for the switch-off. When the electric brake motor blocks, the rotational speed of the motor drops below an associated threshold value, in which case the motor will be switched off.

For practical purposes, the mentioned criteria are considered alternatively, so that the brake motor will be switched off during the retensioning process as soon as one of the criteria has been satisfied.

In addition, it is possible to consider the additional switch-off criterion according to which the retensioning process will be terminated if the retensioning travel executed by the brake piston exceeds an assigned limit value. The limit value assigned to the retensioning travel may be set to a fixed value, such as 200 μm, for example. If the retensioning travel exceeds the limit value first, that is to say, even before the motor current or the rotational speed reaches the respective associated limit values, the retensioning process is likewise terminated.

The limit value assigned to the motor current, for example, is set to the starting current peak that is produced when the electric brake motor is switched on. Either a starting current peak that is typical of the device or the starting current peak of a current tensioning process may be used for this purpose, especially during the retensioning process.

According to another useful development, a fault signal is generated in the event that the requested setpoint application force is unable to be generated via the electric brake motor alone and insufficient hydraulic assistance is provided via the vehicle brake at the same time. If the brake motor is unable to set the setpoint application force during the retensioning, the application force differential must be generated via the hydraulic brake pressure. If no hydraulic brake pressure is applied or if it is of insufficient magnitude, a fault signal is generated, which is able to be processed further in a suitable manner, e.g., displayed to the driver.

Furthermore, it may be useful to implement the retensioning process as a function of the brake disk temperature. Especially during longer braking processes in the course of driving, the temperature of the brake disk may rise considerably and ultimately lead to thorough heating of the brake disk, so that the temperature across the axial thickness of the brake disk is at least essentially uniform. If the parking brake is actuated and set via the electric brake motor while the brake disk is hot and heated once the vehicle has been parked, losses in the application force caused by thermal constriction may arise during the subsequent cooling of the brake disk, which are compensated again via the retensioning.

To the extent that information of the brake disk temperature is available, the retensioning process may be influenced by the brake disk temperature, for example in such a way that the time period between the first tensioning via the electric brake motor and the retensioning process is defined in a variable manner by the brake disk temperature, or that the decision whether retensioning takes place depends on the brake disk temperature.

To ensure that sufficient hydraulic pressure is able to be set, the hydraulic pressure is expediently monitored during the retensioning process, for example in an ESP control unit or by analyzing an instantaneous electrical or mechanical state variable of the brake motor such as the motor current; insufficient hydraulic pressure may be assumed if the gradient of the motor current of the electric brake motor exceeds an associated limit value.

The method according to the present invention runs in a closed-loop or open-loop control unit in the vehicle, which may be part of the parking brake.

DETAILED DESCRIPTION OF THE INVENTION

Figure 1:
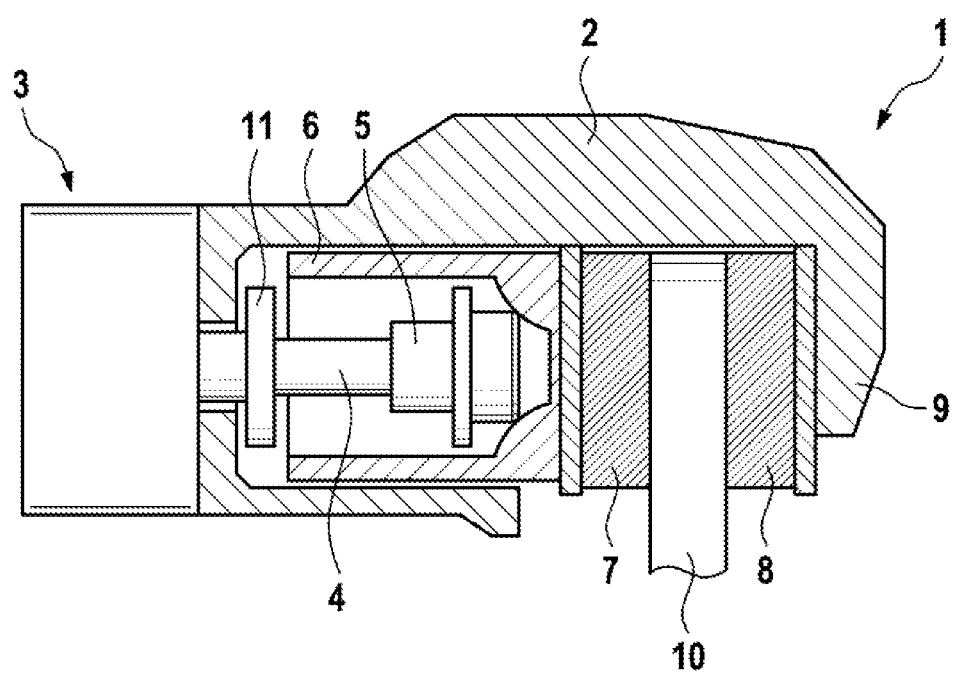
FIG. 1 shows a section through an electromechanical parking brake for a vehicle, including an electrical brake motor for generating an application force that holds the vehicle stationary.

FIG. 1 shows an electromechanical parking brake 1 in a vehicle, the parking brake being able to generate the application force that keeps the vehicle stationary during standstill with the aid of the parking brake. Parking brake 1 includes a brake caliper 2 having a clamp 9 that reaches over a brake disk 10. A brake motor 3, which is developed as an electric motor and rotatably drives a spindle 4, functions as final control element of parking brake 1; a spindle component 5 is supported on spindle 4 in a manner that is axially adjustable and secure from rotation in relation to the housing. Spindle component 5 is axially adjusted when spindle 4 rotates. Spindle component 5 moves within a brake piston 6, which bears a brake pad 7 that is pressed against brake disk 10 by brake piston 6. On the opposite side of brake disk 10, there is another brake pad 8, which is held in a fixed manner on clamp 9.

In the event of a rotary motion of spindle 4, spindle component 5 is able to move within brake piston 6, either axially forward in the direction of brake disk 10 or axially backwards in an opposite rotary motion of spindle 4, until a stop 11 has been reached. In order to generate a desired clamping force, spindle component 5 acts on the inner front end of brake piston 6, so that brake piston 6 supported in parking brake 1 in axially displaceable fashion is pressed with brake pad 7 against the front side of brake disk 10.

In addition, the hydraulic pressure of the regular hydraulic vehicle brake, which is used to brake the vehicle while it is driven, is acting on the brake piston. However, the hydraulic pressure may come to bear as well, in a supporting manner, when the vehicle is standing still and the parking brake is actuated, so that the total application force is composed of the portion supplied by the electric motor and the hydraulic portion.

Figure 2:
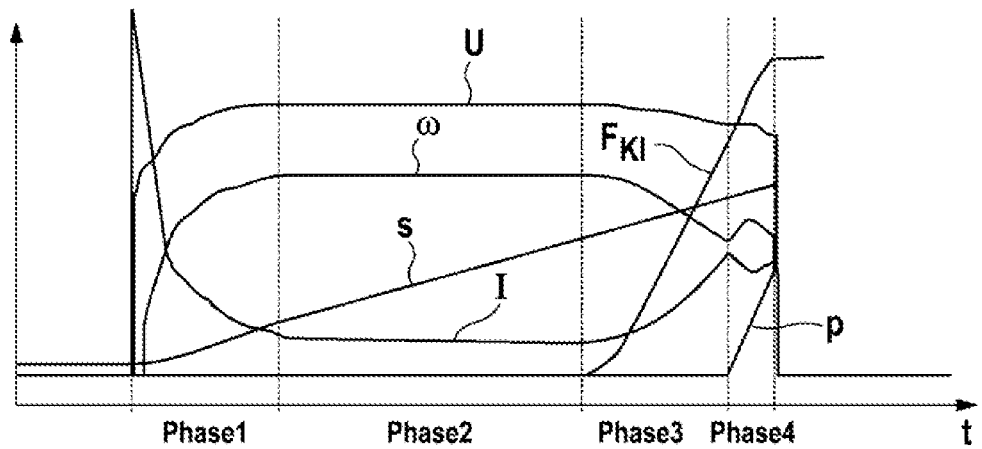
FIG. 2 shows the time characteristic of different state variables of the parking brake during a tensioning process of the parking brake.

FIG. 2 shows a diagram illustrating current characteristic I, voltage U, motor speed characteristic n of the electric brake motor, control travel s of spindle component 5, generated application force $F_{K1}$, and hydraulic pressure p for a tensioning process as a function of time. The brake application process begins at the start of phase 1, in that an electrical voltage is applied and the brake motor is supplied with current in a closed current circuit. At the end of phase 1, voltage U and rotational speed n of the motor have reached their maximum. Phase 2 constitutes the idling phase, in which current I is at a minimum level. This is followed by force buildup phase 3 featuring an increasing electromechanical application force, in which the brake pads rest against the brake disk and are pressed against the brake disk with increasing application force.

In phase 4, hydraulic pressure p of the vehicle brake is acting on the brake piston as well, so that total application force $F_{K1}$ is composed in an additive manner of the application force portion supplied by the electric brake motor and the hydraulic portion. The electric brake motor is switched off at the end of phase 4 by opening the current circuit; the pump motor of the hydraulic vehicle brake is switched off in addition. Hydraulic pressure p, current I, voltage U and motor speed ω of brake motor 3 drop to zero as a result. Total application force $F_{K1}$ is maintained in the process.

Figure 3:
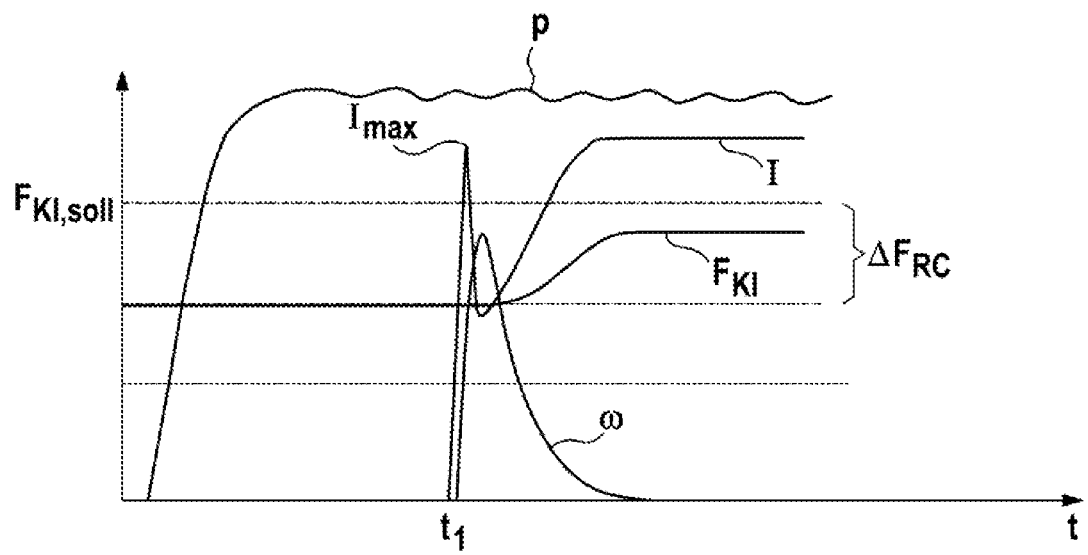
FIG. 3 shows the time characteristic of different state variables of the parking brake during a retensioning process of the parking brake, in which the requested setpoint application force is not achieved.

FIG. 3 shows the signal characteristics of the state variables during a retensioning process that follows the first tensioning process after a certain time interval, so that a diminished application force, for example due to cooling of the brake disk, may be compensated for. Hydraulic pressure p, which is kept at a virtually constant level, acts even before the electric brake motor is switched on. The electric brake motor is switched on at instant t1, whereupon motor current I rises to a starting current peak $I_{max}$. As already described in connection with FIG. 2, motor current I subsequently drops again and rises anew when transmission play of a motor transmission unit which includes the brake motor has been overcome and the brake pads are pressed against the brake disk.

Additional application force $\Delta_{FRC}$ is to be generated in the retensioning process. However, in the exemplary embodiment of FIG. 3, total application force $F_{K1}$, which is composed of the electromotoric portion and the hydraulic portion, does not reach target application force $F_{K1,setpoint}$. This is non-critical, however, as long as it is ensured that actual application force $F_{K1}$ is higher than the application force required to keep the vehicle standing still.

Figure 4:
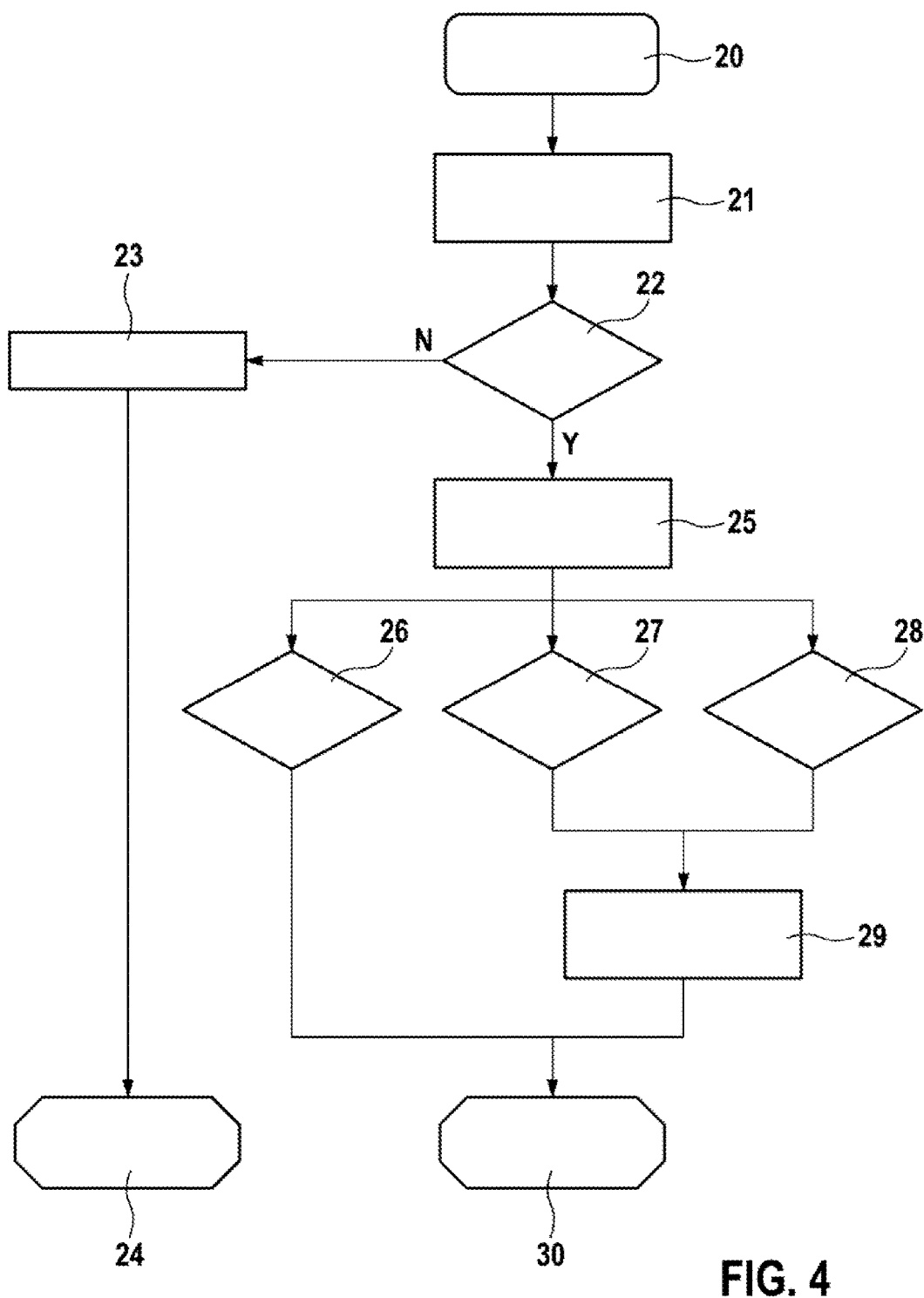
FIG. 4 shows a flow chart with method steps for providing the application force that keeps the vehicle immobile during standstill via the parking brake, with assistance of the hydraulic pressure of the vehicle brake.

FIG. 4 shows a flow chart with method steps for supplying an application force via the parking brake with the assistance of the hydraulic pressure of the vehicle brake. Initially, in a first method step 20, the magnitude of the setpoint application force and the additional application force that is to be applied during the retensioning process in addition is specified. The next method step 21 characterizes the first application process for applying the setpoint application force, which is set by the electric brake motor with support of the hydraulic pressure of the vehicle brake.

The following method steps characterize the retensioning process, which follows the first application process at a defined time interval. For example, the retensioning process is carried out when the gradient of the road on which the vehicle is parked exceeds a limit value. The retensioning process may be performed also when the brake disk temperature lies above a threshold value.

In method step 22 it is queried whether the requested setpoint application force has been reached in the first application process and whether pressure is able to be supplied by the hydraulic system. If one of these conditions is not satisfied, the method continues with method step 23 after the No-branch ("N"), and a fault signal is generated through which the driver is informed, for instance. Branching to method step 24 subsequently takes place, the method has ended. The reason for the fault signal in the exemplary embodiment is that the requested setpoint application force cannot be provided via the electric brake motor alone, so that hydraulic assistance is mandatory.

If the criteria queried in method step 22 are both satisfied, the YES-branching ("Y") is followed by method step 25 according to which the retensioning process is started by renewed tensioning of the electric brake motor. The retensioning process is continued until one of the switch-off conditions formulated in method steps 26, 27, and 28 has been satisfied, which are queried continuously during the retensioning process.

According to method step 26, the electric brake motor is switched off when the retensioning travel covered by the brake piston exceeds an associated limit value. The brake piston is adjusted by the electric brake motor.

According to method step 27, the brake motor is switched off when motor current I exceeds an associated limit value. This limit value for the motor current may be set to the starting current peak $I_{max}$ (FIG. 3), for example. Starting current peak $I_{max}$, for instance, may be determined during the currently executed retensioning process and utilized as the limit value.

According to method step 28, the brake motor is switched off when motor speed $\omega$ drops below an associated limit value. In such a case no further movement of the brake motor is possible and blocking looms, which would put further stress on the mechanical and electrical components.

If the retensioning process is terminated when the condition in method step 26 is present, i.e., a defined brake travel has been covered by the control element acted upon by the brake motor, the method continues with method step 30 and the method is ended. However, if one of switch-off conditions 27 or 28 has been satisfied, it is advanced to method step 29 and a prolonged post-running period of the closed-loop or open-loop control unit of the brake motor is requested. The control unit thereby remains active longer and is able to monitor the vehicle movement via wheel-speed sensors. If a wheel-rotation signal is present, rolling of the vehicle may be inferred, whereupon another retensioning process is triggered. The control unit is switched off only when no rolling of the vehicle is detected during the expanded post-running period.

After method step 29, it is advanced to method step 30, and the method is ended.

What is claimed is:

1. A method for providing an application force generated by a parking brake in a vehicle, the parking brake including at least an electromechanical brake device having an electric brake motor for generating at least a portion of the application force by pressing a brake piston against a brake disk the method comprising:
   performing a first tensioning process in which the electric brake motor is activated to press the brake piston; and
   initiating a retensioning process in which the electric brake motor is reactivated again following the first tensioning process, wherein the retensioning process is terminated if one of a rotational speed of the motor or a variable correlating with the rotational speed of the motor drops below an assigned specified limit value.

2. A control device for controlling an application force generated by a parking brake in a vehicle, the parking brake including at least an electromechanical brake device having an electric brake motor for generating at least a portion of the application force by pressing a brake piston against a brake disk, the control device comprising:
   a control unit including a processor configured to control the following:
      performing a first tensioning process in which the electric brake motor is activated to press the brake piston; and
      initiating a retensioning process in which the electric brake motor is reactivated again following the first tensioning process,
      wherein the processor is configured to terminate the retensioning process one of a current of the motor or a variable correlating with the current of the motor exceeds an assigned specified limit value, and
      wherein the processor is configured to terminate the retensioning process if one of a rotational speed of the motor or a variable correlating with the rotational speed of the motor drops below an assigned specified limit value.

3. The control device as recited in claim 2, wherein the processor is configured to terminate the retensioning process if a retensioning travel traveled by the brake piston exceeds an assigned specified limit value.

4. A method for providing an application force generated by a parking brake in a vehicle, the parking brake including at least an electromechanical brake device having an electric brake motor for generating at least a portion of the application force by pressing a brake piston against a brake disk the method comprising:
   performing a first tensioning process in which the electric brake motor is activated to press the brake piston; and
   initiating a retensioning process in which the electric brake motor is reactivated again following the first tensioning process,
      wherein the retensioning process is terminated if a current of the motor or a variable correlating with the current of the motor exceeds an assigned specified limit value, and
   wherein the retensioning process is terminated if a rotational speed of the motor or a variable correlating with the rotational speed of the motor drops below an assigned specified limit value.

5. The method as recited in claim 4, wherein the retensioning process is also terminated if the retensioning travel traveled by the brake piston exceeds an assigned specified limit value.

6. The method as recited in claim 5, wherein the limit value assigned to the current of the motor corresponds to the starting current peak when the brake motor is switched on.

7. The method as recited in claim 6, wherein the limit value assigned to the current of the motor corresponds to the starting current peak during the retensioning process.

8. The method as recited in claim 6, wherein the parking brake includes a supplementary brake device, and wherein a supplementary application force is generated via the supplementary brake device of the parking brake.

9. The method as recited in claim 8, wherein the supplementary brake device is a hydraulic brake device generating a hydraulic supplementary application force.

10. The method as recited in claim 9, wherein a fault signal is generated if (i) a specified target setpoint application force is unable to be generated solely by the electric brake motor, and (ii) the sum of the application forces generated by the electric brake motor and the hydraulic supplementary application force is insufficient to reach the specified target setpoint application force.

11. The method as recited in claim 10, wherein the hydraulic pressure corresponding to the hydraulic supplementary application force is monitored by an electronic stability program.

12. The method as recited in claim 10, wherein the hydraulic pressure is monitored during the retensioning process.

13. The method as recited in claim 12, wherein insufficient hydraulic pressure is available to reach the target setpoint application force when the gradient of the motor current of the electric brake motor exceeds an assigned specified limit value.

14. The method as recited in claim 6, wherein the retensioning process is implemented as a function of the brake disk temperature.

15. The method as recited in claim 6, wherein, once the retensioning process has been concluded, the vehicle movement is monitored over a defined period of time, and a further retensioning process is triggered when the vehicle is rolling.

* * * * *